(12) United States Patent
Hammarlund et al.

(10) Patent No.: US 6,643,747 B2
(45) Date of Patent: Nov. 4, 2003

(54) PROCESSING REQUESTS TO EFFICIENTLY ACCESS A LIMITED BANDWIDTH STORAGE AREA

(75) Inventors: Per H. Hammarlund, Hillsboro, OR (US); Douglas M. Carmean, Beaverton, OR (US); Michael D. Upton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 518 days.

(21) Appl. No.: 09/751,625

(22) Filed: Dec. 27, 2000

(65) Prior Publication Data

US 2002/0083244 A1 Jun. 27, 2002

(51) Int. Cl.[7] ............................ G06F 12/00; G06F 13/14

(52) U.S. Cl. ........................ 711/151; 711/118; 711/154

(58) Field of Search ................................ 711/100, 118, 711/144, 151, 154

(56) References Cited

U.S. PATENT DOCUMENTS

| | | | | | |
|---|---|---|---|---|---|
| 4,445,174 A | * | 4/1984 | Fletcher | ...................... | 711/121 |
| 5,130,922 A | * | 7/1992 | Liu | ............................. | 711/144 |
| 5,367,643 A | * | 11/1994 | Chang et al. | .................. | 710/62 |
| 5,634,015 A | * | 5/1997 | Chang et al. | ................ | 710/310 |
| 5,845,323 A | * | 12/1998 | Roberts et al. | ............. | 711/128 |
| 6,377,993 B1 | * | 4/2002 | Brandt et al. | ................ | 709/227 |

* cited by examiner

Primary Examiner—Tuan V. Thai
(74) Attorney, Agent, or Firm—Blakely, Sokoloff, Taylor & Zafman LLP

(57) ABSTRACT

A request received from a requester to access a processor cache or register file or the like is buffered, by storing requestor identification, request type, address, and a status of the request. This buffered request may be forwarded to the cache if it has the highest priority among a number of buffered requests that also wish to access the cache. The priority is a function of at least the requestor identification, the requester type, and the status of the request. For buffered requests which include a read, the buffered request is deleted after, not before, receiving an indication that the requestor has received the data read from the cache.

25 Claims, 9 Drawing Sheets

US 6,643,747 B2

PROCESSING REQUESTS TO EFFICIENTLY ACCESS A LIMITED BANDWIDTH STORAGE AREA

BACKGROUND

This invention is generally related to processor and computer architectures, and more particularly to the processing of, including arbitration among, requests for accessing a storage area such as a processor cache or a register file.

High performance storage areas such as a processor cache or a register file help improve the overall performance of a computer system, by providing high speed access to frequently used data. Once the area has been accessed, the stored data can be delivered to the requestor at very high speeds (relative to, for instance, deliveries from main memory or a hard disk). However, the ability of a cache or register file to accept a large number of access requests in the same clock cycle (the so-called 'bandwidth' here) is very limited. The performance of such storage areas are being pushed to their limits by increasingly complex processor and computer architectures in which a large number of requesters can seek access to the same storage area. For instance, in some high performance architectures, a processor cache which can accept at most only one access request every other clock cycle might be saturated by two or more of the following requesters seeking access to the cache in the same clock cycle: a high speed execution core which generates one request, on average, in each clock, and an instruction fetch unit, a page miss handler, and a bus interface, each of which can generate one request every few clocks. Once the cache is saturated, subsequent requests to the cache are rejected. If the cache stays saturated for a long period of time, there is a risk that certain requestors will continue to be repeatedly rejected and thus be 'starved', thereby rendering a performance degradation or, in the worst case, a malfunctioning computer system. Efforts to increase the access bandwidth of the cache may be hampered by the significant increase in cost associated with such a change.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

According to various embodiments of the invention, a technique is disclosed which helps optimize the order in which requests are forwarded to a high performance, low access bandwidth, storage area. This may be achieved by a combination of filtering and merging (while buffering) new requests, reducing unnecessary access requests to the storage area, and ensuring that the requestor receives its requested data before its buffered request is deleted. The invention may improve the performance of a wide range of systems that place a heavy access load on a processor cache, a register file or the like, without having to substantially increase the access bandwidth of the cache or register file or the like.

Figure 1:
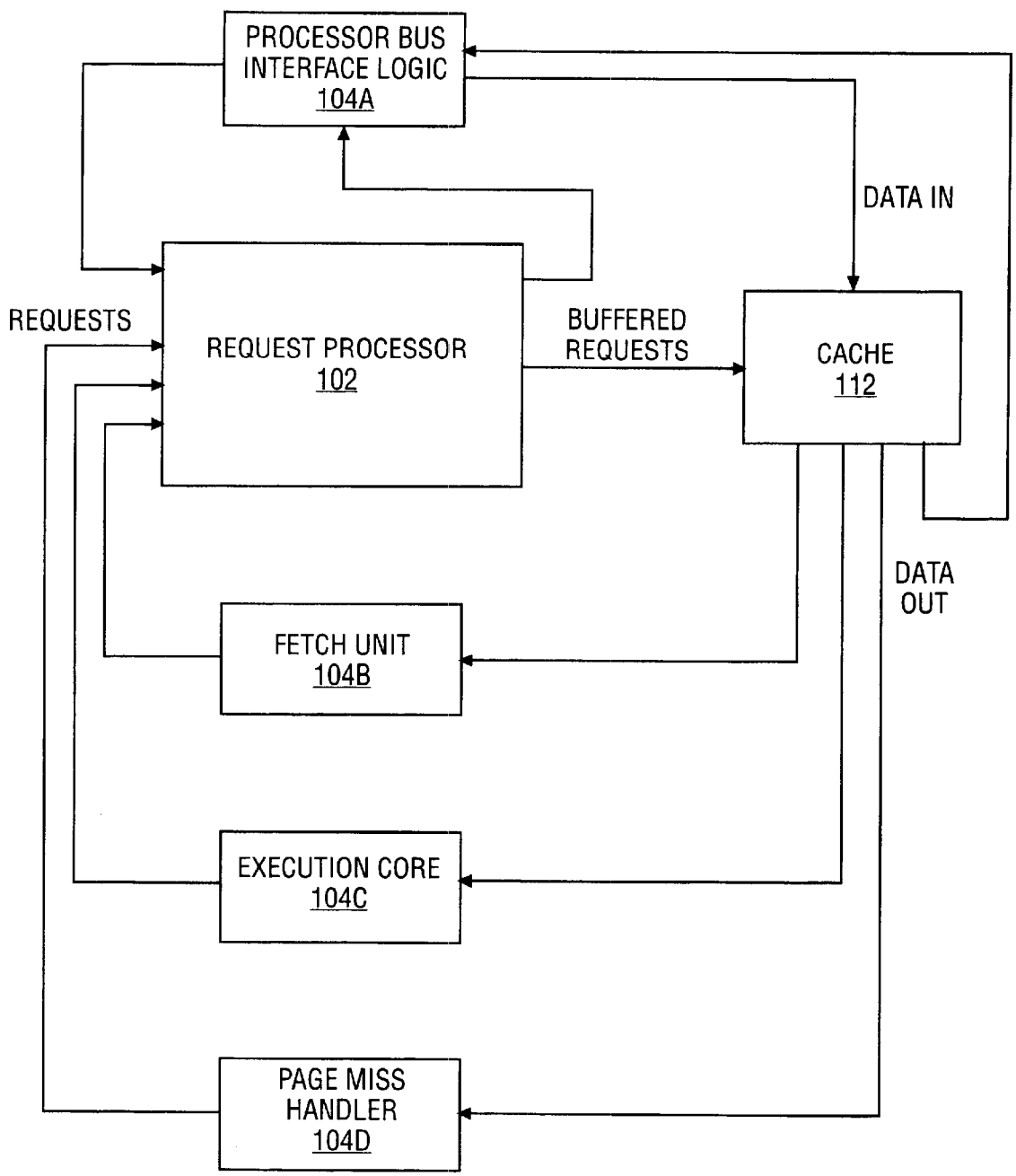
FIG. 1 illustrates a high level view of an embodiment of the invention.

FIG. 1 illustrates a high level view of an embodiment of the invention. A number of requestors 104 (104a, 104b, . . . , 104d) are given access to a storage area being, as an example, a processor cache (cache) 112, through a request processor 102. In general, the storage area may be a cache (first level, intermediate level, or final level), a register file, or the like. For conciseness of the description here, only the cache application will be described. One of ordinary skill in the art will recognize that the concepts here which help obtain more efficient use of a processor cache may also be applicable to make efficient use of a register file and the like. Accordingly, any references to 'cache' are understood to alternatively refer to a register file or the like.

As an example, the requestors 104 may include processor bus interface logic 104a, instruction fetch unit 104b, execution core 104c, and page miss handler (PMH) 104d. Each has a data path in or out of the cache 112, where each path may have a different bit width. For instance, the execution core 104c could be given a wide, fast path. In contrast, the PMH 104d, which typically only reads back a physical address following a virtual address translation look-aside buffer miss, could be given a narrow, slow path from the cache 112.

The tasks performed by the processor bus interface logic 104a include accessing main memory or a higher level cache (not shown) to forward a request from the request processor 102 or evict data from the cache 112 to the main memory, filling the cache 112 when the data arrives from main memory or the higher level cache, and requesting, via the request processor 102, to snoop the cache 112 as part of a memory coherency protocol. The fetch unit 104b sends requests for pulling instructions from the cache 112, and then decodes them after they are received over the data out path of the cache. The execution core 104c places requests for loading data into its registers, for executing the decoded instructions. The PMH 104d as mentioned above sends a request to determine a physical address that corresponds to a virtual address, typically following a virtual to physical translation request that missed a translation look-aside buffer (not shown). Depending on the hardware implementation (e.g. low level cache in a processor chip; higher level cache on a computer motherboard), the requesters 104 may be of different combinations of the ones shown in FIG. 1 or they may be of other types not mentioned here, such as a hardware prefetcher.

The cache 112 may have a defined access service rate, for instance one (1) new request every other or every third clock cycle as perceived by the cache Requests to the cache 112 may be a read, write, fill, and evict (read and invalidate line), as well as others not mentioned specifically herein. The various embodiments of the invention help reduce the performance degradation that would occur when there is a large difference between cache request rate and cache service rate. This might occur, for instance, when cache requests are "bursty" while the service rate remains constant.

The request processor 102 is to buffer the requests and then itself generate access requests to the cache 112 and the bus interface logic 104a in an optimal manner, so that data can be transferred in and out of the cache without unduly starving any requestors. The buffering scheme limits access to the cache 112 on a per request type and per requestor basis. For instance, the maximum number of buffered requests may be as follows: 4 fetch requests, 2 PMH requests, 4 bus requests, and 8 execution core requests. These limits may be selected to reduce the likelihood of any requestor being starved, by evaluating a computer simulation of the expected behavior, including the rates at which new requests are generated, of an actual computer system that features the request processor 102.

Figure 2:
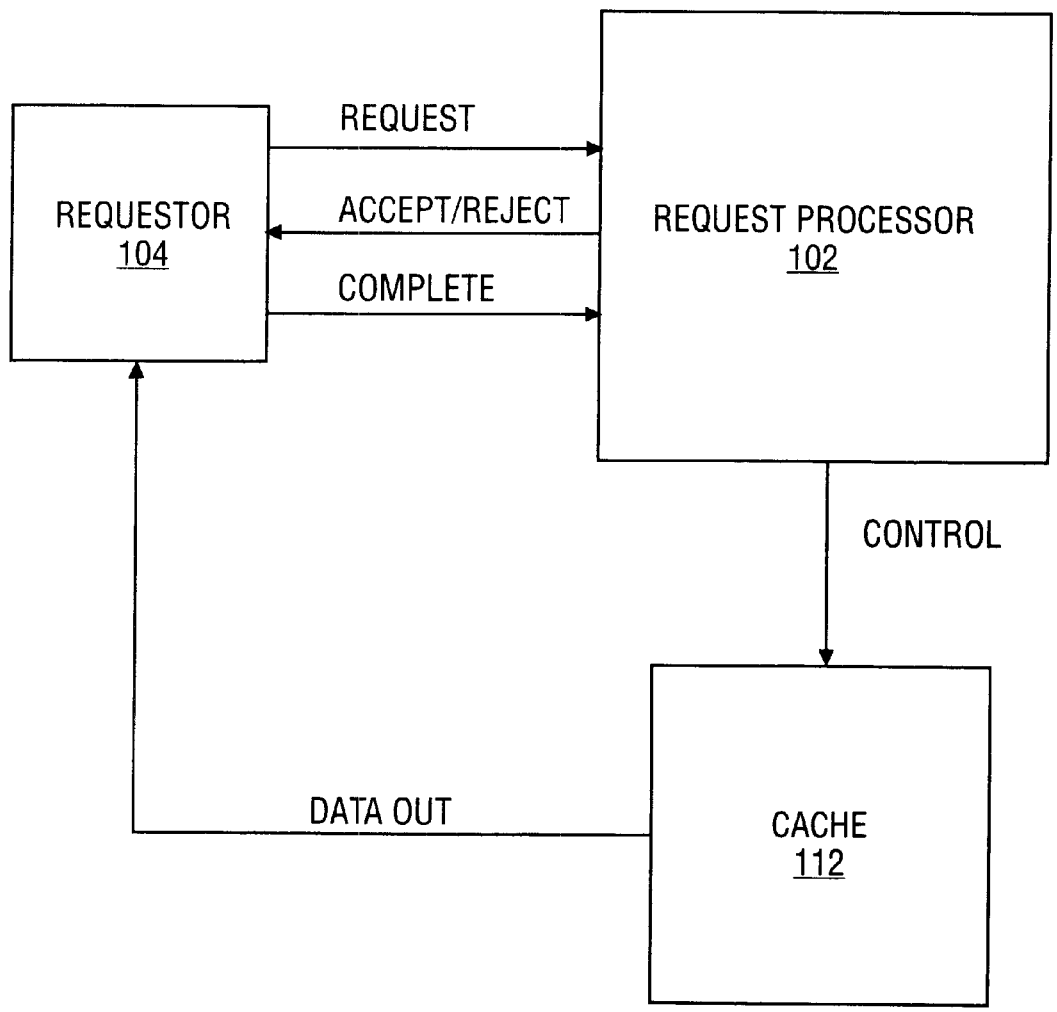
FIG. 2 shows a lower level view of the interaction between a requester, a request processor, and a storage area.

FIG. 2 shows a lower level view of the interaction between a requestor 104, the request processor 102, and the cache 112. The request processor 102 either accepts or rejects a new request made by the requester 104, by a suitable bus signaling protocol. If accepted, the new request is buffered (if it cannot be immediately passed on to the cache 112) and eventually forwarded (as a buffered request) to the cache at a later time. When the requested data becomes available, the data may be provided by the cache 112 directly to the requestor 104. Thereafter, the requester 104 may issue a 'Complete' notification to the request processor 102, indicating that the requested data has been successfully received. Only then will the buffered request be deleted by the request processor 102. This completion notification helps ensure a more reliable performance by the request processor. In addition, this flexibility allows the buffering to satisfy a memory coherency protocol which requires that a requester read the data from the cache before the line is evicted.

Figure 3:
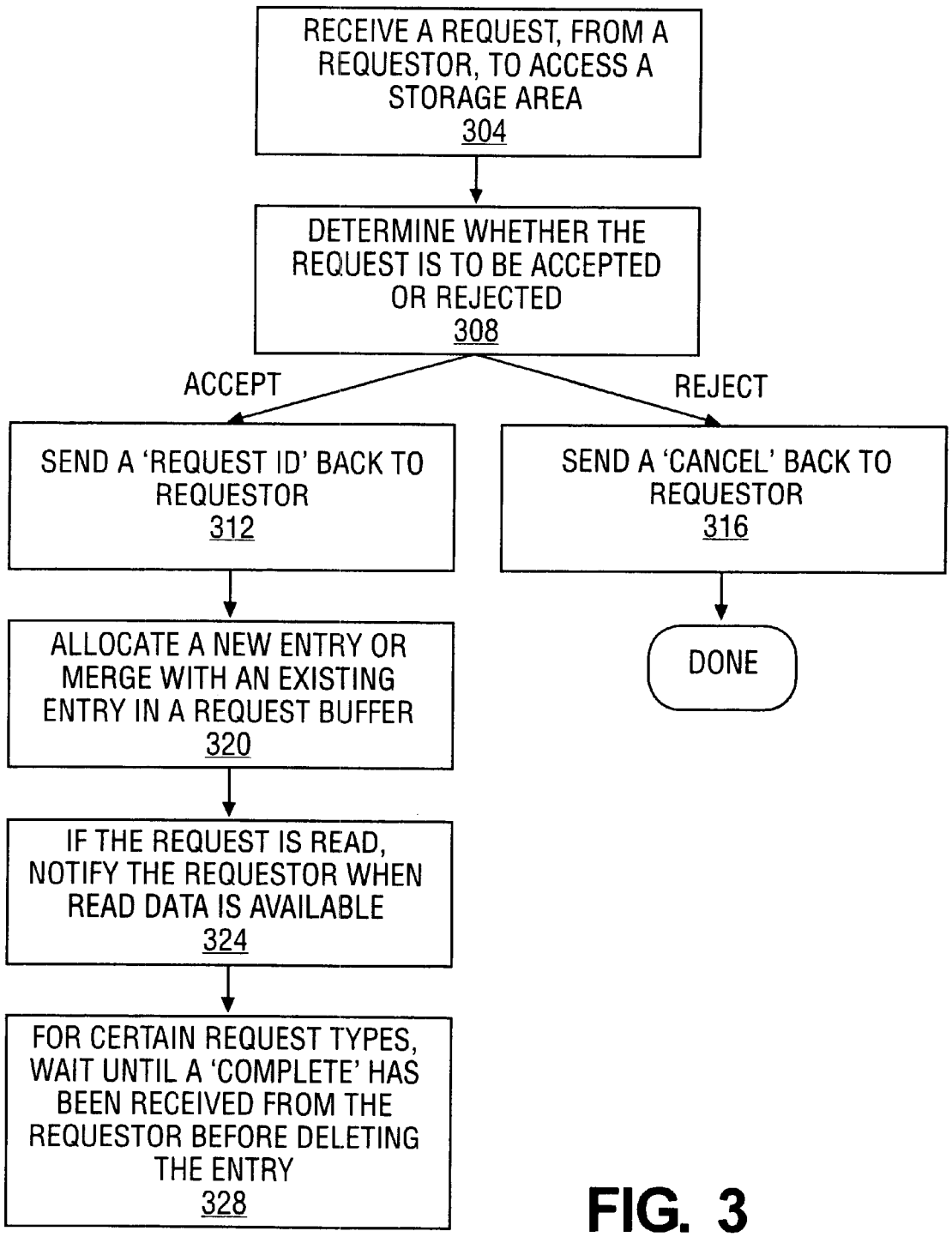
FIG. 3 depicts a process flow diagram of the interface between the requester and the request processor.

Referring now to FIG. 3, a process flow diagram of the interface between the requester and the request processor is depicted. Operation begins with receiving a request, from a requester, to access the cache 112 (block 304). The request processor then determines whether the new request is to be accepted or rejected (block 308). A procedure for determining whether a request is to be rejected will be described below with reference to FIG. 8. If the request is to be accepted, operation proceeds by sending a request identification (request ID) back to the requestor (block 312). If the request cannot be immediately forwarded to the cache, the request is buffered. The request ID uniquely identifies the corresponding buffered request. According to an embodiment of the invention, this buffering is accomplished by allocating a new entry or merging with an existing entry in a request buffer (operation 320).

The request may be of a variety of different types. For instance, if the request is a read, then the requester is notified when read data is available from the cache (block 324). For certain types of requests, including certain reads, the request processor waits until a Complete notification has been received from the requester before deleting the buffered request (block 328). As mentioned above, this has the advantageous feature of providing a more reliable performance by the request processor.

Returning to block 308, if it's determined that the request is to be rejected (e.g. there is a conflict with a previously buffered request or there is no space to buffer the request), then a Cancel notification is sent back to the requestor 104, in which case the requester 104 may attempt to send the request again at a later time.

It should be noted that a requestor can cancel one of its own previous, buffered requests, by sending a cancel request and the request id of the buffered request to the request processor.

Figure 4:
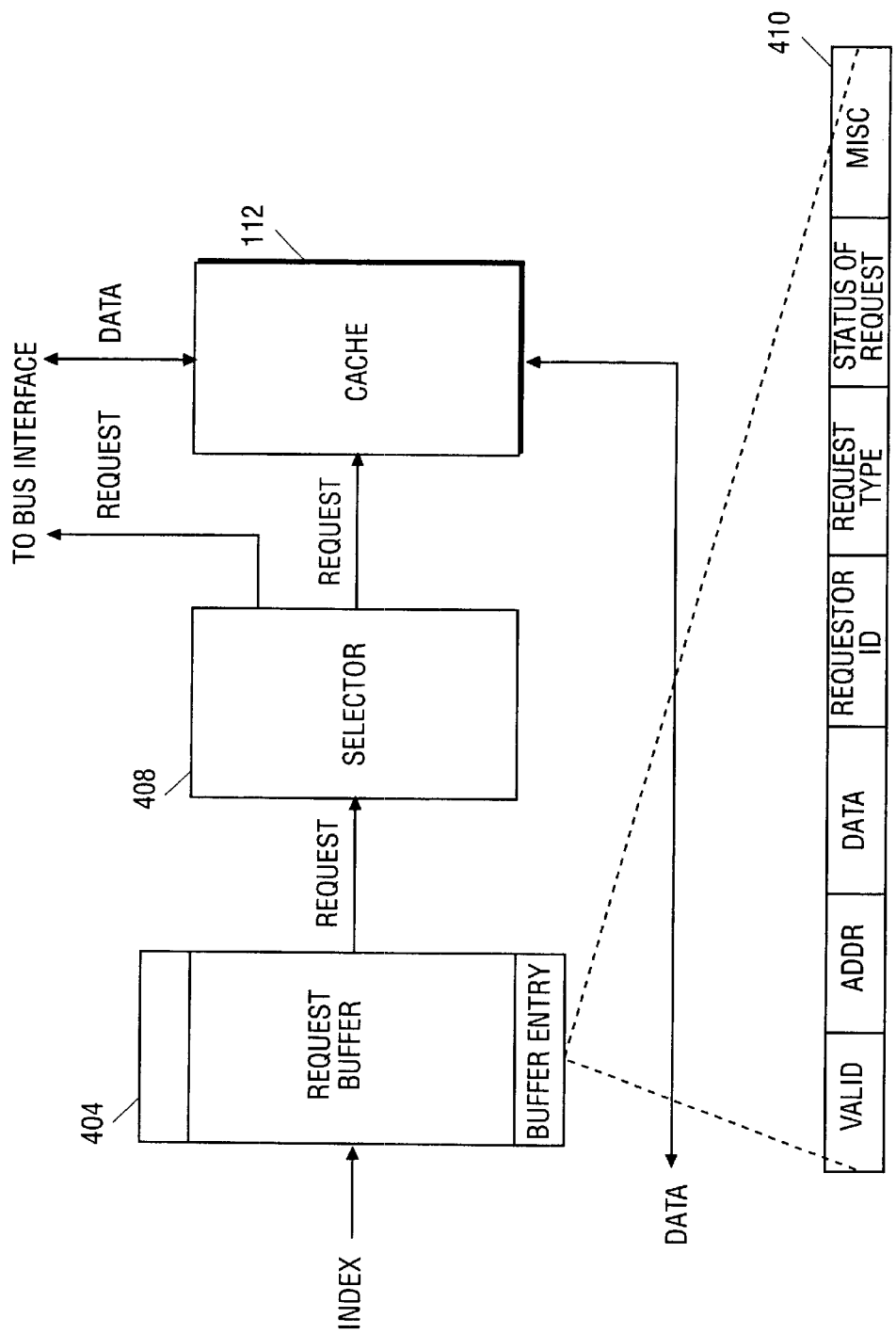
FIG. 4 illustrates a block diagram of the request processor interacting with the storage area, according to an embodiment of the invention.

Referring now to FIG. 4, a block diagram of the request processor 102 interacting with the cache 112, according to an embodiment of the invention, is illustrated. The request processor in this embodiment includes a request buffer 404 which includes a number of entries 410. Each entry 410 corresponds to a buffered request. The entries 410 may be indexed by, for instance, the request ID. Each buffer entry 410 includes:

- a Validity field, which may be used to represent whether a buffered request is present or deleted,
- an Address field which contains an address that has been specified in the corresponding received request (used to access data in the cache 112),
- a data field in which return data originating from the cache 112 and destined to the requester 104 may be temporarily stored,
- a Requestor Identification field for containing a value which uniquely identifies each requestor to the request processor 102,
- a Request Type field whose contents identify the type of request (e.g. read, write, cache line evict, etc.),
- a Status of Request field which indicates what the request processor 112 has done for this buffered request until now, and
- a Miscellaneous field whose contents may only be understood by the corresponding requester 104.

For the Misc. field, the request processor 102 merely acts as a conduit to place certain data that has been provided by the requestor 104 into this field. The contents may be communicated back to the requestor 104 along with return data and/or the request ID. Additional fields may also be allocated if desired to support further functionality.

As an alternative to sending read data directly from the cache 112 when it becomes available, the request processor 102 may be involved in sending the return data to the requester 104, where the process may be initiated by sending the request ID (for the buffered request) to the requester 104, prior to instructing the cache 112 to deliver the data.

The request processor 102 also includes selector logic 408 designed to forward a buffered request to the cache 112 if the buffered request has the highest priority among a number of buffered requests that wish to access the cache 112. The priority of each buffered request is a function of several variables, including the Requestor ID, the Request Type, and the Status of the Request. This feature allows, for example, an uncacheable access request from the fetch unit 104b to have higher priority than certain types of bus requests, as will be described below with reference to FIG. 5. The selector 408 contains circuitry that reads at least the Valid, Requestor ID, Request Type, and Status of Request fields of each buffer entry 410 in the request buffer 404, and in response decides which buffered request to forward to the cache 112. This may be done using a parallel comparison circuit, such as one that performs a content addressable memory (CAM) match between the relevant contents of each buffer entry 410 and predefined sets of bit fields where each set defines a particular priority for accessing the cache 112.

Note that a requestor 104 may generate requests in backwards order, from a priority point of view, while the selector 408 reorders those requests which have been buffered, starting with the higher priority ones first. It does so by recognizing that certain types of requests or certain requestors that are maintained in the buffer 404 have higher priority over others. For instance, consider that a speculative request is generated, and is therefore buffered, earlier in time than a non-speculative request (generated later in time by the same requester.) In such a case, if both requests have been buffered, the non-speculative one would be selected over the speculative one. In fact, the non-speculative request, according to certain embodiments of the invention, may be deleted if the selector 408 deems it to be conflicting with the later issued non-speculative request. Thus, by allowing such forwarding of requests out of order, unnecessary accesses to the cache, such as the above mentioned buffered speculative requests, are avoided.

In determining which is the most important (highest priority) buffered request, the selector 410 is given the knowledge that, in addition to different requestors 104 being capable of having different priorities, different types of requests from the same requester 104 may also have different priorities. For instance, as shown in the priority diagram of FIG. 5, the selector 410 could be configured to recognize that certain types of bus requests are of lower priority than certain types of execution core requests or fetch unit requests. This is evidenced by the vertically oriented bars which show a range of priorities according to type, from each requestor 104. The priority of a buffered request may also depend on how far along the request is, as indicated by the contents of its Status field. For example, the priority of a buffered read request may increase as it gets closer to the state at which the read data is ready for transfer from the cache to the requester.

Figure 5:
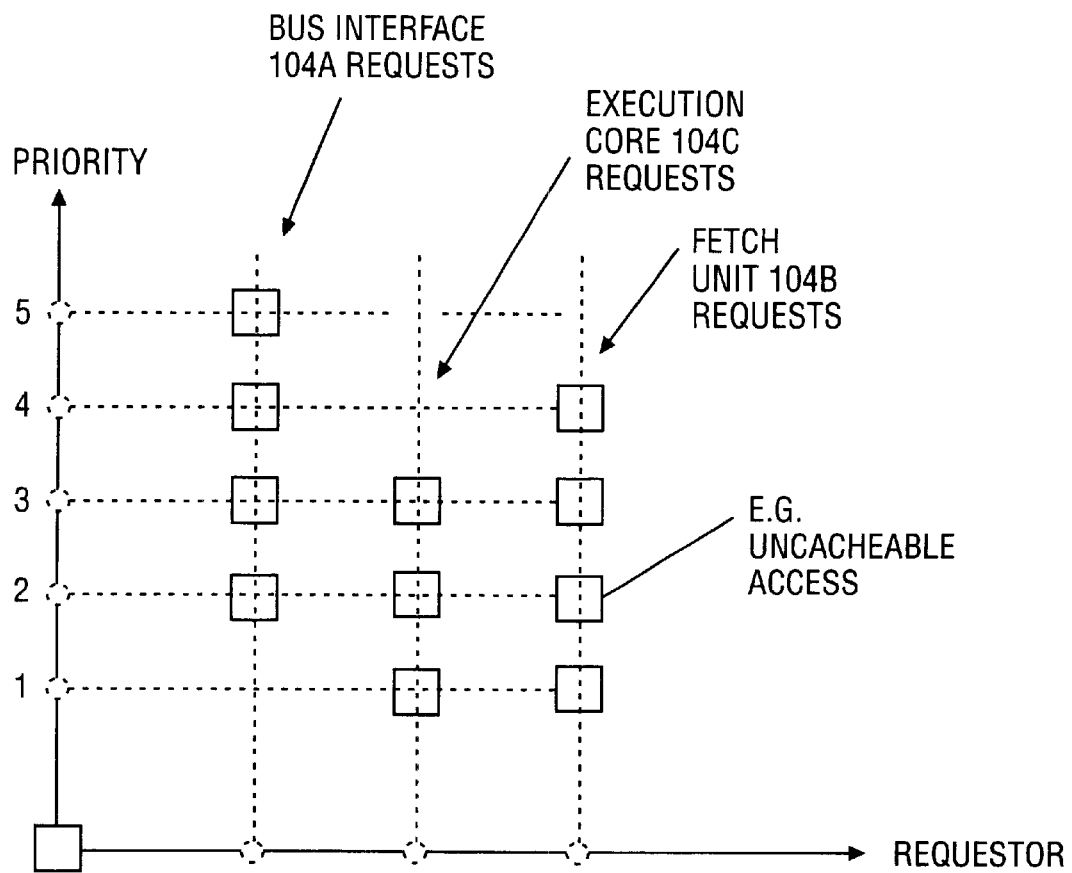
FIG. 5 shows how to determine the priority of a buffered request, according to requester and request type, in a multiple requestor and request type scenario.

According to another embodiment of the invention, the request processor 102 is to "merge" a new request with a buffered request if it appears, for example, that the requester is making multiple requests to read the same cache line. For instance, if a requester generates essentially two of the same requests, without receiving a cancel or data available notification for one of them, then the new request is used to update the existing, buffered request from the same requestor. If the new request has a higher priority than the existing buffered request, then the priority of the buffered request is changed to at least that of the new request. This changing of the priority may be obtained indirectly, by changing the Request Type of the existing entry that corresponds to the buffered request, to that of the new request. Such a change in the Request Type is done only if the Address and the Requestor ID of the new request match that of the existing, valid entry. Situations where this may occur include, for instance, when a first request in time is a speculative read from a given address, and a subsequent request is a non-speculative read from that address, where both requests have been generated by the execution core 104c. The Request Type will be changed from being that of a speculative read to an actual non-speculative read. This change in the Request Type will, according to an embodiment of the invention, result in an increase in the priority of the buffered request, by moving vertically upwards to a higher priority level for execution core 104c requests, as seen in FIG. 5. By merging the subsequent request with the existing buffered request in this manner, the request processor 102 helps further minimize accesses to the cache, by insuring that only a single buffered request remains to satisfy the two different requests that have been received.

Figure 6:
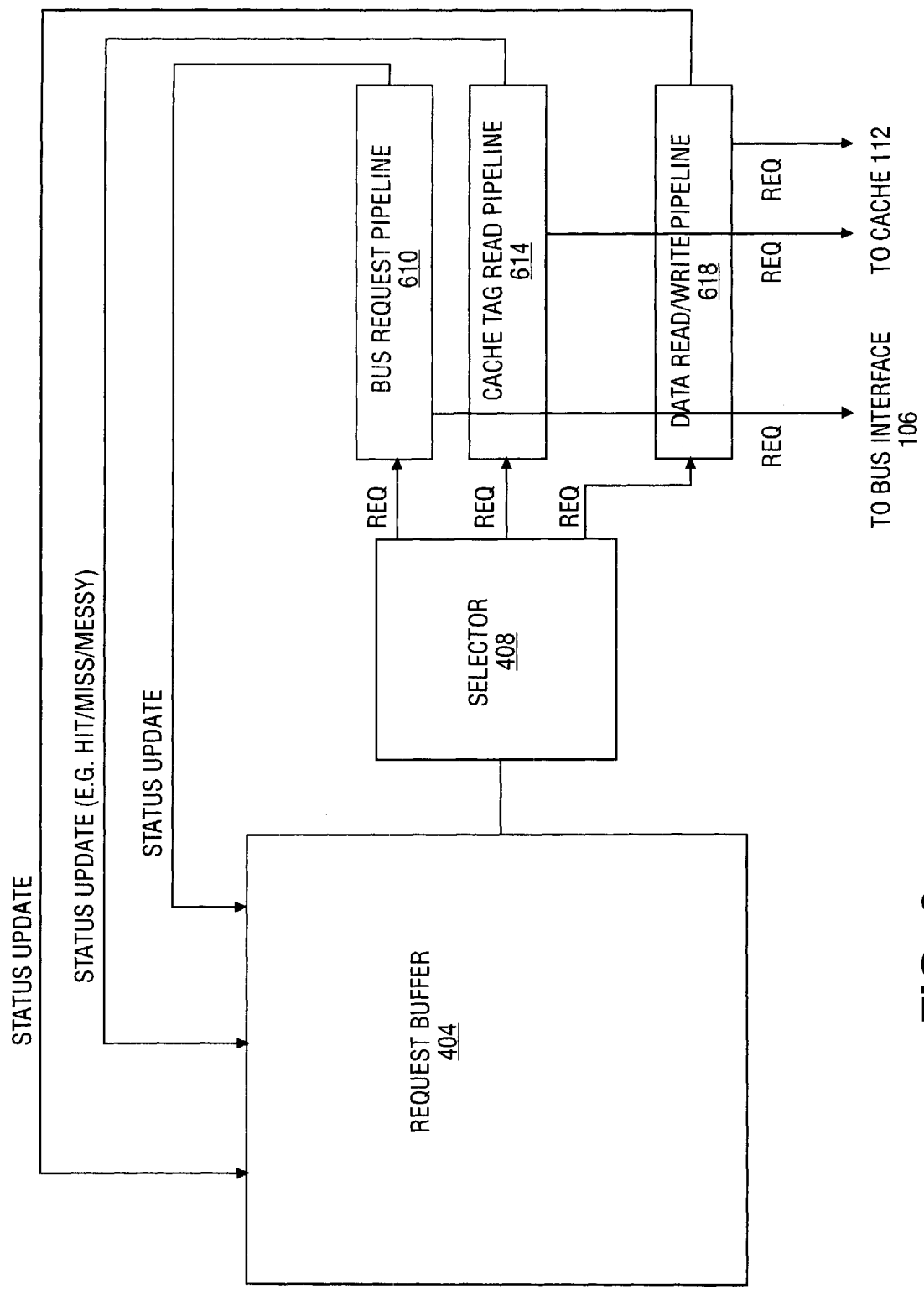
FIG. 6 depicts how request status information is generated and used by the request processor, according to an embodiment of the invention.

The forwarding of buffered requests to the cache 112 may be implemented using a pipeline for each type of request. This embodiment of the invention is illustrated in FIG. 6 in which the selector 408 feeds in each clock cycle a selected buffered request to one of a number of different request execution pipelines 610, 614, . . . 618. As an example, FIG. 6 shows a bus request pipeline 610 for executing requests to access the bus interface logic 104a, a cache tag read pipeline 614 to execute requests to read a tag from the cache 112, and a data read/write pipeline 618 to execute read and write requests (given a tag) to the cache. According to an embodiment of the invention, the selector 408 determines whether there is a valid entry in the request buffer 404 that is in a given state (by checking the Status of Request field of the entry 410, see FIG. 4), which permits the corresponding buffered request to be executed by one of the pipelines. If there is such an entry, then the request ID of that entry is passed to the appropriate pipeline, which can in turn access the entry 410 in the request buffer 404 to obtain whatever information it needs to execute the request. When a buffered request has passed through a pipeline, the Status field in the entry 410 which corresponds to the buffered request is updated. Note that a single, new request may lead to buffered requests being sent into multiple pipelines, before the new request has been completely serviced.

In another embodiment of the invention, there may be separate selector logic for each pipeline, such that in one clock, multiple, mutually non-exclusive requests can be sent into their respective pipelines. Such a parallel processing capability further enhances the performance of the request processor.

Figure 7:
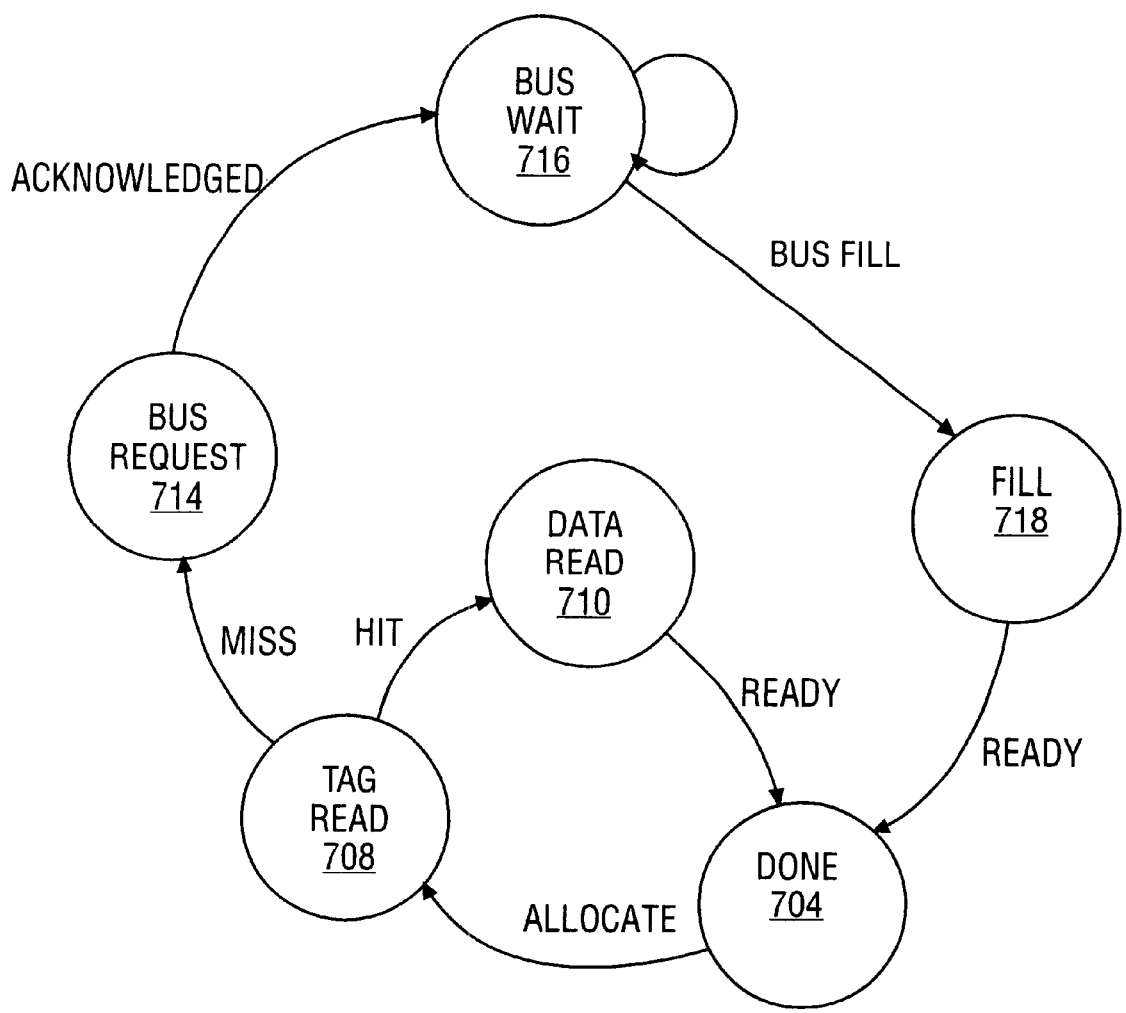
FIG. 7 shows an exemplary state diagram of transitions in the status of a buffered request.

FIG. 7 illustrates an exemplary state diagram of the transition between different states for a particular entry 410 in the request buffer 404. Consider, for instance, that a request from the PMH 104d (see FIG. 1) is received and buffered. By allocating an entry 410 in the buffer 404, the state of the entry 410 changes from the Done state 704 to a Tag Read state 708. The selector logic 408 may then, at a later time, select this entry and send a Tag Read request, with the request ID that is in the entry, to the cache tag read pipeline 614 (see FIG. 6). When the cache tags have been accessed by the pipeline, hit/miss information is available and is provided back to the buffer 404 as a status update (see FIG. 6). If the update is a hit, then the state of the subject entry is changed from Tag Read 708 to Data Read 710. This causes the selector 408 at a later time to send a data read request with the request ID of the subject entry, to the data read pipeline 618 (see FIG. 6), where the address to be read from is indicated by the tag.

According to an embodiment of the invention, if the tag read results in a cache miss, then the state of the subject entry in the request buffer is changed to Bus Request state 714. Thereafter, the selector 408, in response to detecting this state in the subject entry, sends a request, via the bus request pipeline 610 (see FIG. 6) to get the missing data from main memory (not shown). In addition, if other new read requests are received for the same address as the subject entry, the request processor knows that the prior bus request to that address is still pending (by virtue of the Status field indicating the Bus Request state). Accordingly, the request processor will not perform a tag read for the new request. Thus, precious cache tag access bandwidth is saved.

Once the read data is ready for transfer to the requester, the cache sends a Ready indication to the buffer which results in the Status of the buffered request being changed to the Done state 704. At this time, the requester may be notified (by, e.g., sending a 'Done' signal based on the request and requester IDs of the buffered request.)

Returning to the Bus Request state 714, following a Tag Read miss, once the bus request has been acknowledged (by, e.g., the bus interface logic 104a), the Status of the buffered request is changed to the Bus Wait state 716. The buffered request remains in this state until a Bus Fill notification is received by the request buffer, signifying that the requested data is being transferred into the cache 112, and the buffered request changes to the Fill state 718. When the cache 112 has been filled with all of the requested data, the cache 112 is once again ready to return data back to the requester, in the Done state 704.

Figure 8:
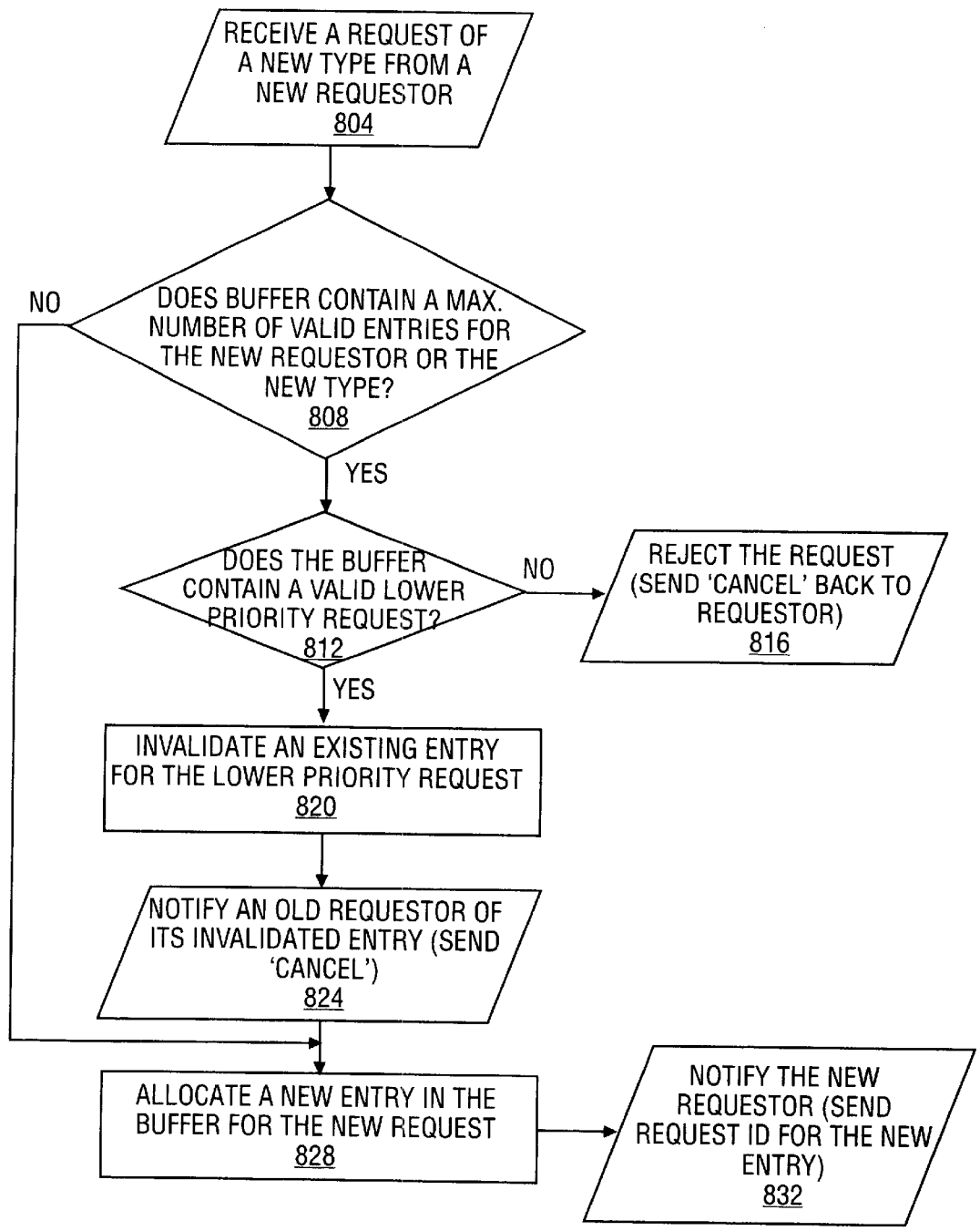
FIGS. 8 and 9 illustrate process flow diagrams for buffering a new request, according to an embodiment of the invention.
Figure 9:
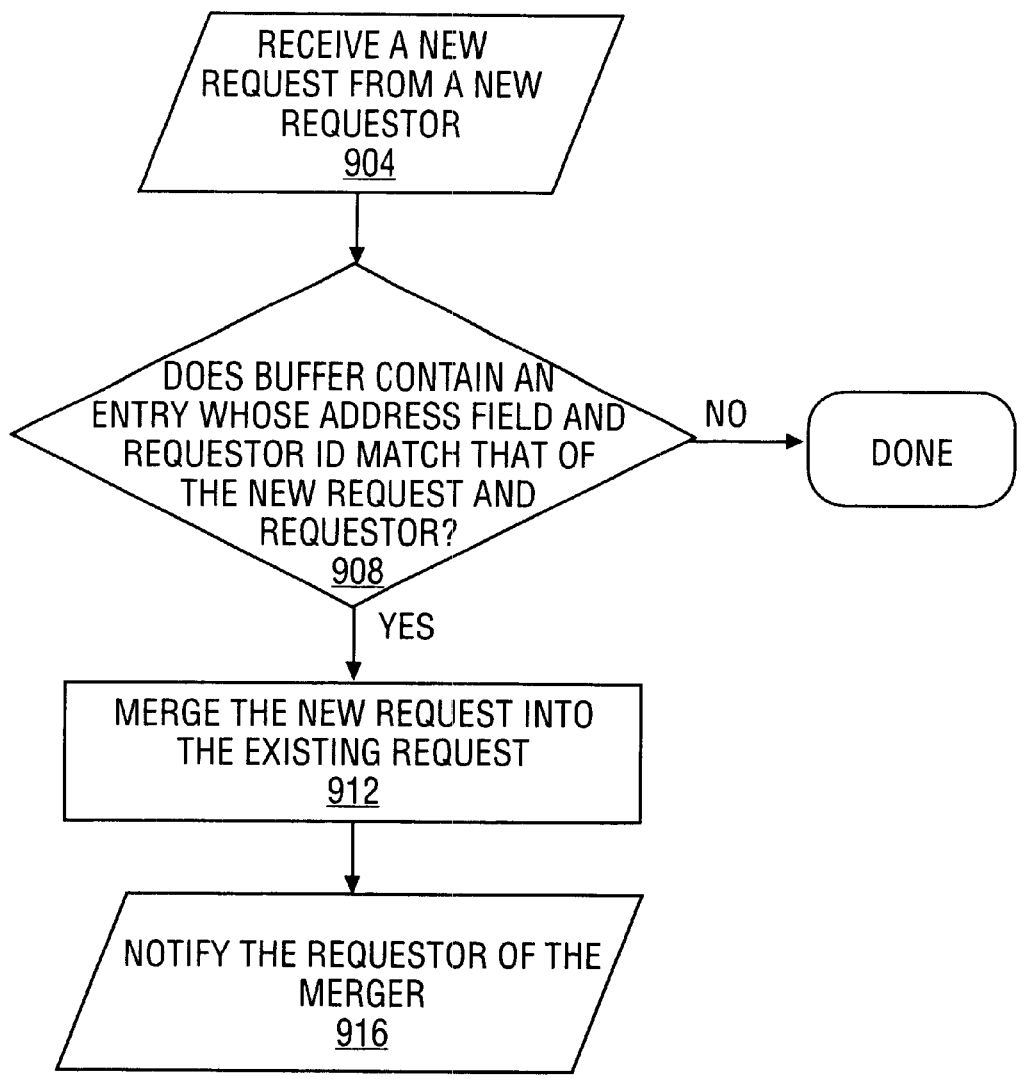

Turning now to FIGS. 8 and 9, process flow diagrams for buffering a request, according to an embodiment of the invention, are illustrated. Beginning with FIG. 8, in operation 804, a new request (indicating a new type) from a new requestor is received by the request processor. Assuming there are no conflicting previously buffered requests, a decision is made as to whether the buffer contains a maximum number of valid entries for the new requestor or the new type (block 808). As was mentioned above, the request processor may be pre-configured with a maximum permissible number of valid entries for each requestor as well as a maximum number of entries of a given type of request. If these maximum values have not been met or exceeded, then the new request may be buffered. Thus, in block 828, a new entry in the buffer is allocated for the new request. The new requester is notified of this buffered request by sending a request ID for the new entry to the new requestor (block 832).

Even if the maximum number of valid entries for either the new requestor or the particular type of request have been met, the new request may still be buffered if the buffer contains a valid request that is of lower priority than the new request (block 812). If there are no lower priority buffered requests, then the request processor has no choice but to reject the new request, such as by sending a Cancel back to the new requestor (block 816). If, however, there is a lower priority request, then this lower priority request is deleted, such as by its valid entry being invalidated (block 820). In so doing, the request processor also notifies the old requester of its invalidated entry, by sending a Cancel to the old requestor identified in the invalidated entry (block 824). The new request is then allocated a new entry as in blocks 828 and 832 which were described above.

FIG. 9 illustrates a process flow diagram for buffering a new request by merging it with an existing request. Once again, operation begins with receiving a new request from a new requestor (block 904). If the buffer contains an entry whose address field and requestor ID match that of the new request and the new requestor (block 908), then the new request is merged with the existing request, if, for instance, both requests are read requests, by changing the request type of the existing entry to that of the new request (block 912). The new requester is then notified of the merger by being sent a new request ID (block 916).

The request processor 102 may be a slave to a memory coherency engine (not shown.) Memory coherency may be implemented in the protocol, which determines how to allocate a new entry in the buffer. For instance, if an evict cache line request is already buffered and valid, then a new request to read from the cache line will not be allocated (this is also an example of a conflicting request.) In that case, the request processor sends a Cancel back to the requestor in response to the new request.

The various embodiments of the invention described above for improving the efficiency in accessing a cache may be implemented as part of cache arbiter or cache controller logic in a processor integrated circuit (IC) die. The cache may be of a first level or higher level type that could be either part of the processor die or it could be off chip, such as a conventional higher level cache. In the latter case, the cache would be off chip to a main processor which contains the execution core, the instruction fetch unit, and the bus interface logic described above. In addition, this main processor would also include, on chip, the request processor according to any of the various embodiments described above.

To summarize, various embodiments of the invention directed to a request processor and a request processing method have been described. The invention allows a relatively large number of requesters to be satisfied with a relatively modest cache access bandwidth. It will, however, be evident that various modifications and changes may be made to the structures and methods described above, without departing from the broader spirit and scope of the invention as set forth in the appended claims. The specification and drawings are, accordingly, to be regarded in an illustrative rather than a restrictive sense.

What is claimed is:

1. A method comprising:

buffering a request received from a requestor to access a cache, by storing a requester identification, a request type, and a status of the request;

forwarding the buffered request to the cache if the buffered request has the highest priority among a plurality of buffered requests to access the cache, the priority being a function of the requestor identification, the request type, and the status of the request; and if the buffered request includes a read of data from the cache, deleting the buffered request after, not before, receiving an indication that the requestor has received the data read from the cache.

2. The method of claim 1, wherein the buffering includes allocating a valid entry in a buffer, to identify the request, the entry to specify the requester identification, the request type, and the status of the request, the buffered request is forwarded if the entry has the highest priority among a plurality of valid entries in the buffer, the priority of the entry being a function of the requestor identification, the request type, and the status of the request, and the deleting includes invalidating the entry after, not before, receiving the indication that the requestor has received the data read from the cache or register file.

3. The method of claim 2 wherein the entry further includes an address, specified in the received request, to access the data in the cache or register file.

4. The method of claim 3 further comprising:

changing the request type of the entry to that of a new request if the address and the requester identification match that of the new request.

5. The method of claim 2 further comprising:

invalidating the entry if the buffer is deemed full when a new request, having a higher priority than the entry, is received from a new requestor; and notifying the requestor that the request has been cancelled if the entry is invalidated.

6. The method of claim 5 wherein the buffer is deemed full for the new request if a maximum number of valid entries for one of (1) the new requestor and (2) a type of the new request, exist in the buffer.

7. The method of claim 2 further comprising:

changing the status of the buffered request, the buffered request including a cache read, each time forward progress is made, in response to (1) allocating the entry in the buffer, (2) receiving a cache hit/miss in response to sending a request to read a cache tag, (3) requesting to read one of a main memory and a higher level cache and (4) filling the cache with read data specified by the cache read.

8. The method of claim 7 further comprising:

receiving a new request for a cache read, prior to receiving the indication that the requestor has received the data read from the cache, the new request matching an address of the buffered request; and then allocating a new entry in the buffer to identify the new request and setting a status of the new request to indicate waiting for read data to be filled, without accessing the cache to read a cache tag.

9. A processor comprising:

a plurality of requesters;

a cache; and a request processor coupled to receive requests from the requestors to access the cache, the request processor having a request buffer to store a requestor identification, a request type, and a status of a request received from any of the requesters to access the cache, and selector logic to forward a buffered request to the cache if the buffered request has the highest priority among a plurality of buffered requests, each buffered request having a priority that is a function of its requester identification, request type, and status, if the buffered request includes a read of data from the cache, the request processor is to delete the buffered request after, not before, receiving an indication that the requestor has received the data read from the cache.

10. The processor of claim 9 wherein the request buffer has a plurality of entries each to identify a respective buffered request, each entry includes a validity field, the requestor ID, the request type, and the status of the respective buffered request, wherein the respective buffered request is deemed deleted if the entry is invalidated.

11. The processor of claim 10 wherein each entry in the request buffer further includes an address field to contain an address, specified in a received request to access data in the cache.

12. The processor of claim 11 wherein the selector logic is to change the request type of the entry to that of a new request if the address and the requestor ID in the entry match that of the new request.

13. The processor of claim 10 wherein the request processor is to invalidate the entry if the buffer is deemed full when a new request, having a higher priority than the entry, is received from a new requestor.

14. The processor of claim 13 wherein the buffer is deemed full for the new request if a maximum number of valid entries for one of (1) the new requester and (2) a type of the new request, exist in the buffer.

15. The processor of claim 10 wherein the request processor is to change the status of the buffered request, the buffered request including a cache read, each time forward progress is made, in response to (1) allocating the entry in the buffer, (2) receiving a cache hit/miss in response to sending a request to read a cache tag, (3) requesting to read one of a main memory and a higher level cache, and (4) the cache being filled with read data specified by the cache read.

16. The processor of claim 10 wherein if the request processor receives a new request for a cache read, prior to receiving the indication that the requestor has received the data read from the cache, the new request matching an address of the buffered request, the request processor is to allocate a new entry in the buffer to identify the new request and set a status of the new request to indicate waiting for read data to be filled, without accessing the cache to read a cache tag.

17. A computer system comprising:

a cache;

a processor coupled to the cache, the processor having an execution core, an instruction fetch unit, and bus interface logic to access one or both of (1) a main memory and (2) a high level cache; and a request processor coupled to receive requests from the execution core, the fetch unit, and the bus interface logic, to access the cache, the request processor having a request buffer to store a requestor identification, a request type, and a status of a request received from any one of the execution core, the fetch unit, and the bus interface unit, to access the cache, and selector logic to forward a buffered request to the cache if the buffered request has the highest priority among a plurality of buffered requests, each buffered request having a priority that is a function of its requester identification, its request type, and its status, if the buffered request includes a read of data from the cache, the request processor is to delete the buffered request after, not before, receiving an indication that the requestor has received the data read from the cache.

18. The computer system of claim 17 wherein in the request processor, the request buffer has a plurality of entries each to identify a respective buffered request, each entry includes a validity field, the requestor ID, the request type, and the status of the respective buffered request, wherein the respective buffered request is deemed deleted if the entry is invalidated.

19. The computer system of claim 18 wherein each entry in the request buffer further includes an address field to contain an address, specified in a received request to access data in the cache.

20. The computer system of claim 19 wherein the selector logic is to change the request type of the entry to that of a new request if the address and the requester ID in the entry match that of the new request and if the new request is non-speculative.

21. The computer system of claim 18 wherein the request processor is to invalidate the entry if the buffer is deemed full when a new request, having a higher priority than the entry, is received from a new requestor.

22. The computer system of claim 21 wherein the buffer is deemed full for the new request if a maximum number of valid entries for one of (1) the new requestor and (2) a type of the new request, exist in the buffer.

23. The computer system of claim 18 wherein the request processor is to change the status of the buffered request, the buffered request including a cache read, each time forward progress is made, in response to (1) allocating the entry in the buffer, (2) receiving a cache hit/miss in response to sending a request to read a cache tag, (3) requesting to read one of the main memory and the high level cache, and (4) the cache being filled with read data specified by the cache read.

24. The computer system of claim 23 wherein if the request processor receives a new request for a cache read, prior to receiving the indication that the requester has received the data read from the cache, the new request matching an address of the buffered request, the request processor is to allocate a new entry in the buffer to identify the new request and set a status of the new request to indicate waiting for read data to be filled, without accessing the cache to read a cache tag.

25. The computer system of claim 17 wherein the request processor further includes a plurality of pipelines, some of which being coupled to execute requests to access the cache and another being coupled to execute a request to access one of the main memory and the high level cache through the bus interface logic.

* * * * *